United States Patent
Marzola

(10) Patent No.: US 11,906,098 B2
(45) Date of Patent: Feb. 20, 2024

(54) DUAL CONTROL EMERGENCY RELEASE SYSTEM

(71) Applicant: EMCO Wheaton GmbH, Kirchhain (DE)

(72) Inventor: Filippo Marzola, Kirchhain (DE)

(73) Assignee: EMCO Wheaton GmbH, Kirchhain (DE)

( * ) Notice: Subject to any disclaimer, the term of this patent is extended or adjusted under 35 U.S.C. 154(b) by 308 days.

(21) Appl. No.: 17/199,783

(22) Filed: Mar. 12, 2021

(65) Prior Publication Data

US 2021/0199228 A1 Jul. 1, 2021

Related U.S. Application Data

(63) Continuation of application No. PCT/US2019/051145, filed on Sep. 13, 2019.

(60) Provisional application No. 62/731,450, filed on Sep. 14, 2018.

(51) Int. Cl.
*F16L 55/10* (2006.01)
*B67D 9/02* (2010.01)

(52) U.S. Cl.
CPC .......... *F16L 55/1015* (2013.01); *B67D 9/02* (2013.01)

(58) Field of Classification Search
CPC ......... B67D 9/02; B67D 9/00; F16L 55/1015; F16L 55/1007
See application file for complete search history.

(56) References Cited

U.S. PATENT DOCUMENTS 4,306,739 A * 12/1981 Bormioli ................. F16L 23/06
285/365
8,336,579 B2 12/2012 LeDevehat et al.

FOREIGN PATENT DOCUMENTS

| EP | 3274775 A1 | 1/2018 |
| JP | 5216350 B2 | 3/2013 |
| JP | 2013160350 A | 8/2013 |
| JP | 6348924 B2 | 6/2018 |
| KR | 101649796 B1 | 8/2016 |

(Continued)

OTHER PUBLICATIONS

JP2017193356A machine translation (Year: 2017).*

(Continued)

*Primary Examiner* — Michael R Reid
(74) *Attorney, Agent, or Firm* — Edell, Shapiro & Finnan, LLC

(57) ABSTRACT

An emergency release system for a fluid transfer system is disclosed. The fluid transfer system includes a first valve and a second valve that is selectively fluidly coupled to the first valve. The emergency release system includes a breakaway coupler mechanism engageable with the first valve and the second valve to releasably couple the first valve and the second valve together, an actuator mechanism defined by a dual rod having a first rod member and a second rod member releasably attached to the first rod member, the first rod member engageable with the first valve and the second rod member engageable with the second valve, and a piston-cylinder assembly configured to engage the actuator mechanism to selectively and simultaneously close the first and second valves, and to disengage the breakaway coupler mechanism from the first valve and the second valve.

20 Claims, 18 Drawing Sheets

(56) References Cited

FOREIGN PATENT DOCUMENTS

WO    2014167343  A1    10/2014

OTHER PUBLICATIONS

Extended European Search Report for EP Application No. 19858913.7 dated May 20, 2022, 9 pages.
Office Action for Indonesian Patent Application No. P00202102441 with machine translation, dated Sep. 13, 2022, 3 pages.
Notification Concerning Transmittal of International Preliminary Report on Patentability (IPRP) including IPRP and Written Opinion for No. PCT/US2019/051145 dated Mar. 9, 2021, 9 pages.
International Search Report and Written Opinion for International Patent Application No. PCT/US2019/051145 dated Nov. 19, 2019, 9 pages.

* cited by examiner

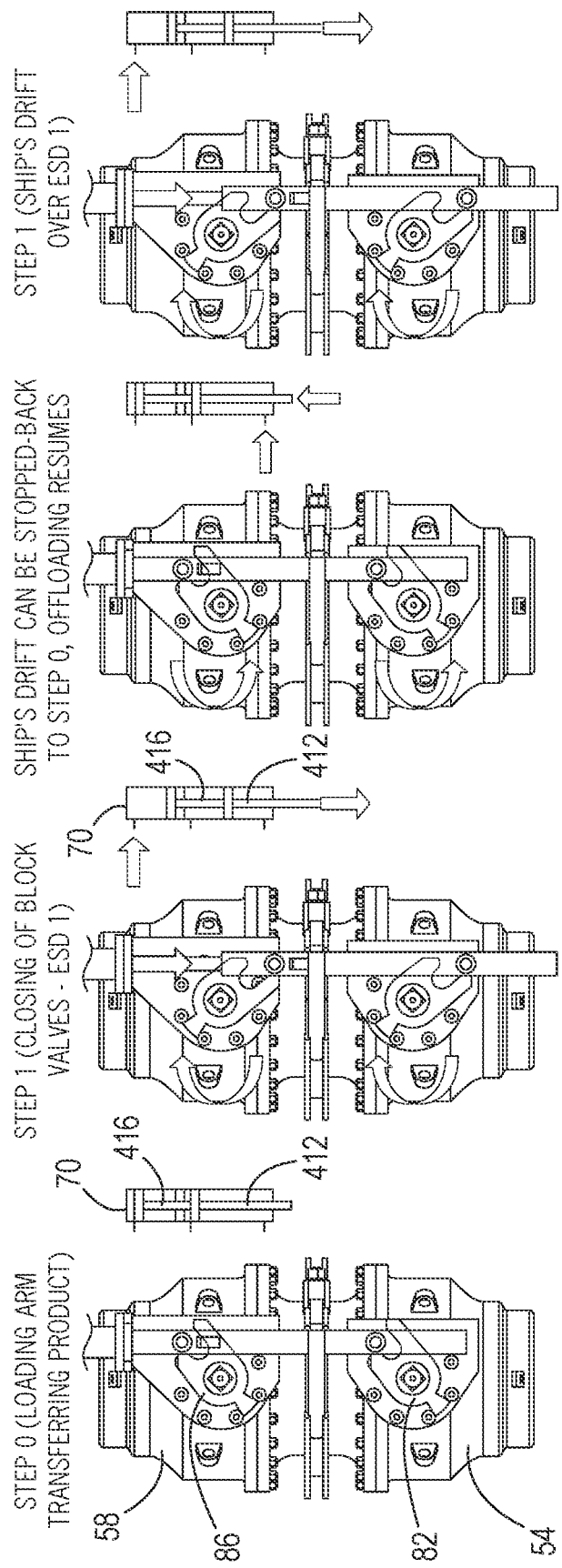

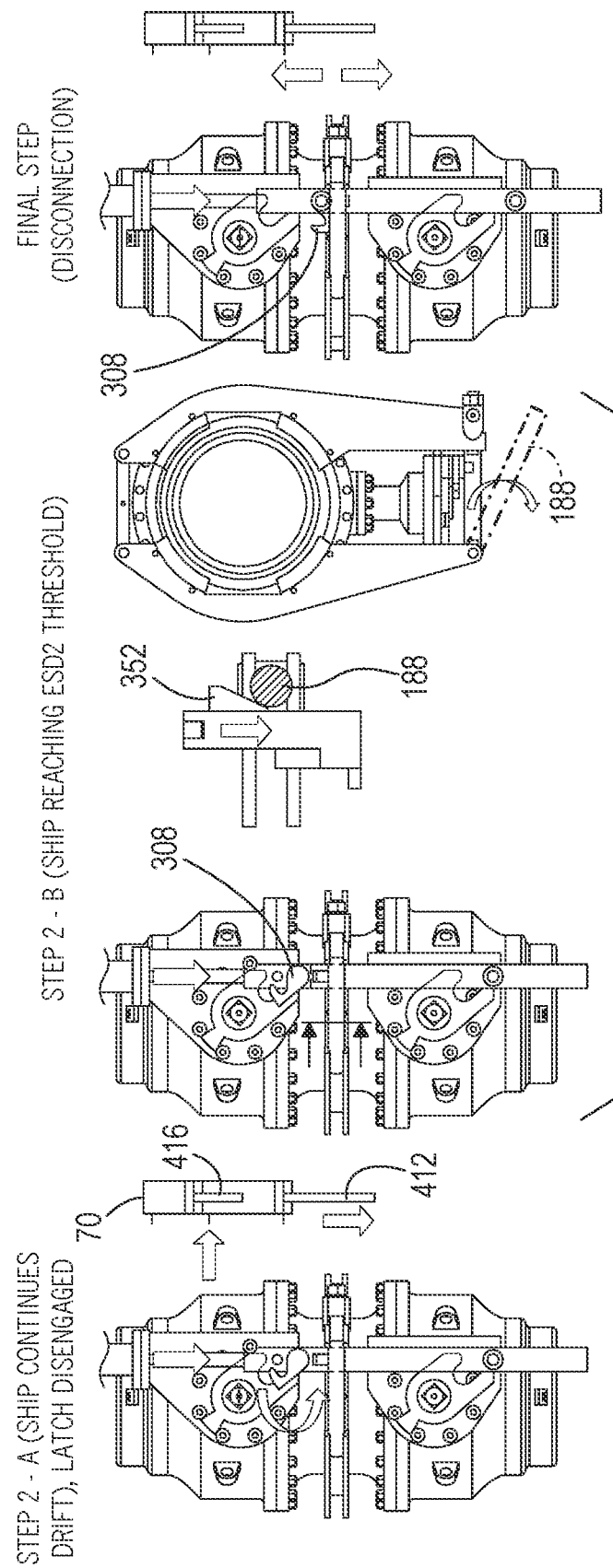

DUAL CONTROL EMERGENCY RELEASE SYSTEM

CROSS-REFERENCE TO RELATED APPLICATIONS

This application is a continuation of international App. No. PCT/US2019/051145, filed Sep. 13, 2019, which claims the benefit of U.S. Provisional Patent Application No. 62/731,450, filed on Sep. 14, 2018. The entire contents of each of these applications are incorporated herein by reference.

BACKGROUND

The present invention relates to a system for quickly and safely disconnecting a loading arm from a vessel (e.g., a river barge, ship, ocean-going super tanker, or the like).

Loading arms transfer almost any liquid and compressed gas product to and from vessels. Transferring fluid between land and a vessel typically requires a safety device for quick and safe disconnection to prevent damage to personnel or property as well as to reduce the amount of product spillage.

SUMMARY

In one embodiment, an emergency release system for a fluid transfer system is disclosed. The fluid transfer system includes a first valve and a second valve that is selectively fluidly coupled to the first valve. The emergency release system includes a breakaway coupler mechanism engageable with the first valve and the second valve to releasably couple the first valve and the second valve together, an actuator mechanism defined by a dual rod having a first rod member and a second rod member releasably attached to the first rod member, the first rod member engageable with the first valve and the second rod member engageable with the second valve, and a piston-cylinder assembly configured to engage the actuator mechanism to selectively and simultaneously close the first and second valves, and to disengage the breakaway coupler mechanism from the first valve and the second valve.

In another embodiment, a method is disclosed for of releasing a connection between first and second valves of a fluid transfer system. The method includes detecting a first shut down condition, actuating an actuator mechanism to close the first and second valves, the actuator mechanism including a first rod member coupled to the first valve and a second rod member coupled to the second valve, the first rod member being coupled to the second rod member, detecting a second shut down condition; and separating the first rod member from the second rod member and decoupling a coupler from the first valve and the second valve.

In one embodiment, an emergency release system for a fluid transfer system is disclosed. The fluid transfer system includes a first valve and a second valve that is selectively fluidly coupled to the first valve. The emergency release system includes a breakaway coupler mechanism engageable with the first valve and the second valve to releasably couple the first valve and the second valve together, an actuator mechanism defined by a dual rod having a first rod member and a second rod member releaseably attached to the first rod member by a latch, the latch being rotatably coupled to one of the first rod member and the second rod member and selectively coupleable with the other of the first rod member and the second rod member, the first rod member engageable with the first valve and the second rod member engageable with the second valve, and a piston-cylinder assembly configured to engage the actuator mechanism to selectively and simultaneously close the first and second valves, and to disengage the breakaway coupler mechanism from the first valve and the second valve.

BRIEF DESCRIPTION OF THE DRAWINGS

FIGS. 22A-22G is illustrate the operational steps of the emergency release system.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
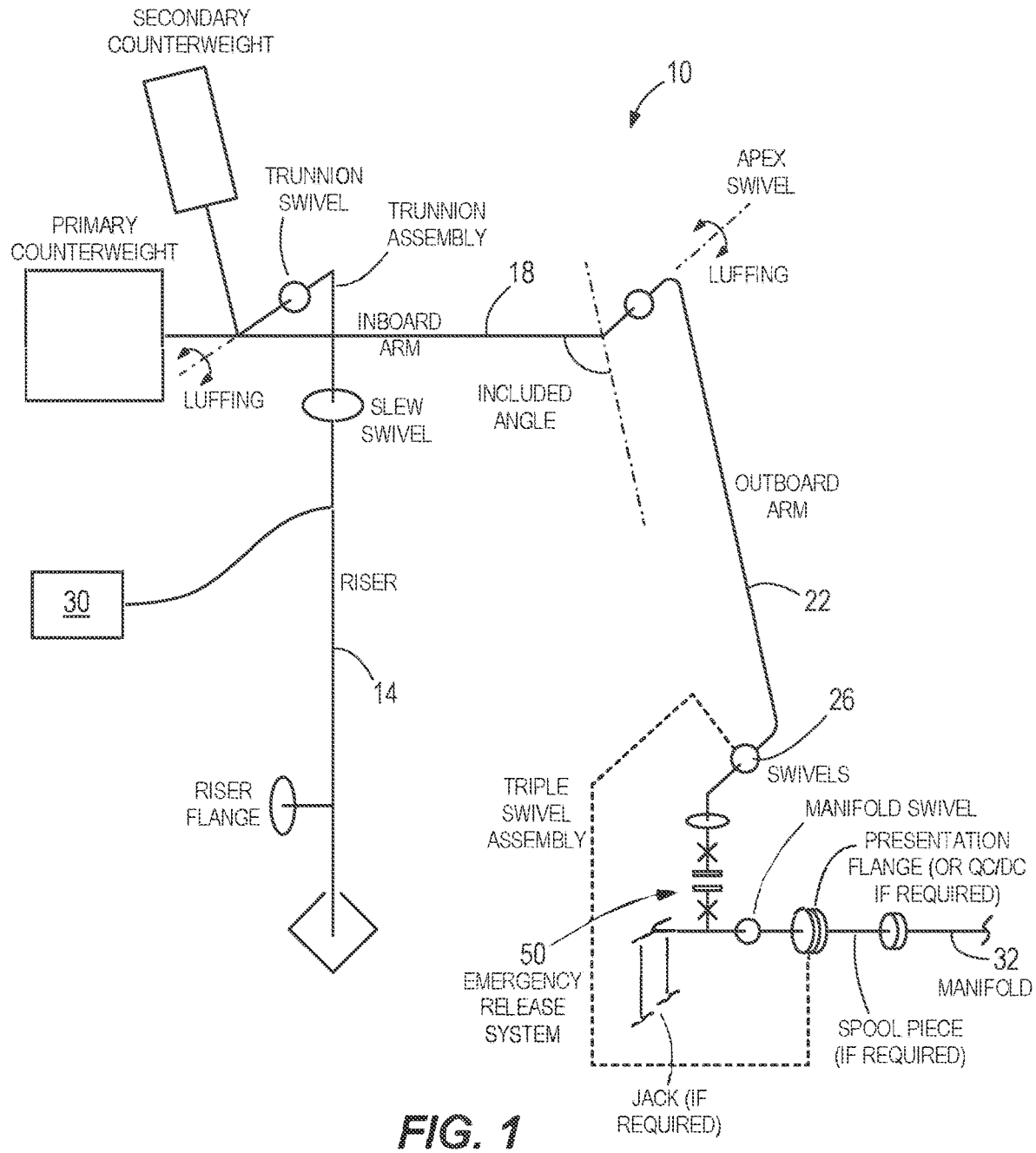
FIG. 1 is a schematic of a loading arm including a riser, an inboard arm, an outboard arm, and an emergency release system coupled adjacent an end of the loading arm.

FIG. 1 illustrates a schematic of a loading arm 10 including a riser 14, an inboard arm 18, and an outboard arm 22. The outboard arm 22 includes an outboard swivel 26 that permits rotational movement of the arm 10 for connection with a vessel (e.g., a ship, a railcar, or a vehicle such as a truck) via a manifold 32 that mates with a manifold (not shown) on the vessel to facilitate the transfer of product to or from the vessel. The loading arm 10 is configured to operate within a defined operating envelope. That is, the loading arm 10 is configured such that the inboard arm 18 and the outboard arm 22 can only extend to a predetermined distance from the riser 14. As shown in FIG. 1, the loading arm 10 has a position monitoring system 30 that measures the position of the inboard arm 18 and the outboard loading arm 20, and therefore the position of vessel, relative to the riser 14.

With reference to FIGS. 1-4, the loading arm 10 also includes an emergency release system 50. The emergency release system 50 is positioned at a location between the outboard swivel 26 and the manifold 32 to provide a mechanism that quickly and safely disconnects the loading arm 10 from a vessel with minimal product spillage due to relative movement between the loading arm 10 and the vessel (e.g., due to an emergency situation such as drift of the vessel, an example of which is described in detail below). The emergency release system 50 includes a first valve 54, a second valve 58 that is aligned with the first valve 54 along axis A and that is selectively secured to the first valve 58 by an emergency release coupler 62, and an actuator assembly 64 that has an actuator mechanism 66 (e.g., a scotch-yoke mechanism) and a double-stroke hydraulic cylinder 70 (e.g., a piston-cylinder assembly).

The first and the second valves 54, 58 can be block valves (e.g., ball valves) or other types of valves that are suitable for closing off flow of fluid. As will be understood, each valve 54, 58 is manipulatable between an open position permitting fluid flow through the emergency release system 50 and a closed position that inhibits fluid flow. With reference to FIGS. 2-4, 14, 15, and 17, the first valve 54 has a flange 74 (best seen in FIG. 14) that is sized and shaped to abut a flange 78 (best seen in FIG. 15) on the second valve 58. The first valve 54 also has a first valve actuator 82 (best seen in FIGS. 2-4) that is manipulatable (e.g., pivotable 90 degrees) to vary the first valve 54 between open and closed positions. The second valve 58 also has a second valve actuator 86 (best seen in FIGS. 2-4) that is manipulatable to vary the second valve 58 between open and closed positions (e.g., pivotable 90 degrees). Each of the first and the second valve actuators 82, 86 is movable between a first position in which the respective first and valves 54, 58 are open (see FIGS. 2, 3A, 4, 6-7, and 22), and a second position in which the respective first and the second valves 54, 58 are closed (see FIGS. 3B, 9-10, 12-13, 22).

As shown in FIGS. 2-4 and 17-19, the coupler 62 includes a first clamp member 120 and a second clamp member 124 that are coupled together and define a breakaway coupler mechanism. The first clamp member 120 has a first end 136 and a second end 140 opposite the first end 136, and an arcuately shape portion 142 that is disposed between the first and second ends 136, 140 and that has an arcuate channel 144. The second clamp member 124 has a first end 150 and a second end 154 opposite the first end 150, and an arcuately shape portion 158 that is disposed between the first and second ends 150, 154 and that has an arcuate channel 162. The channels 144, 162 are complementary to and engage the abutting flanges 74, 78 of the first and second valves 54, 58 to secure the valves 54, 58 together when the emergency release system 50 is assembled.

Figure 17:
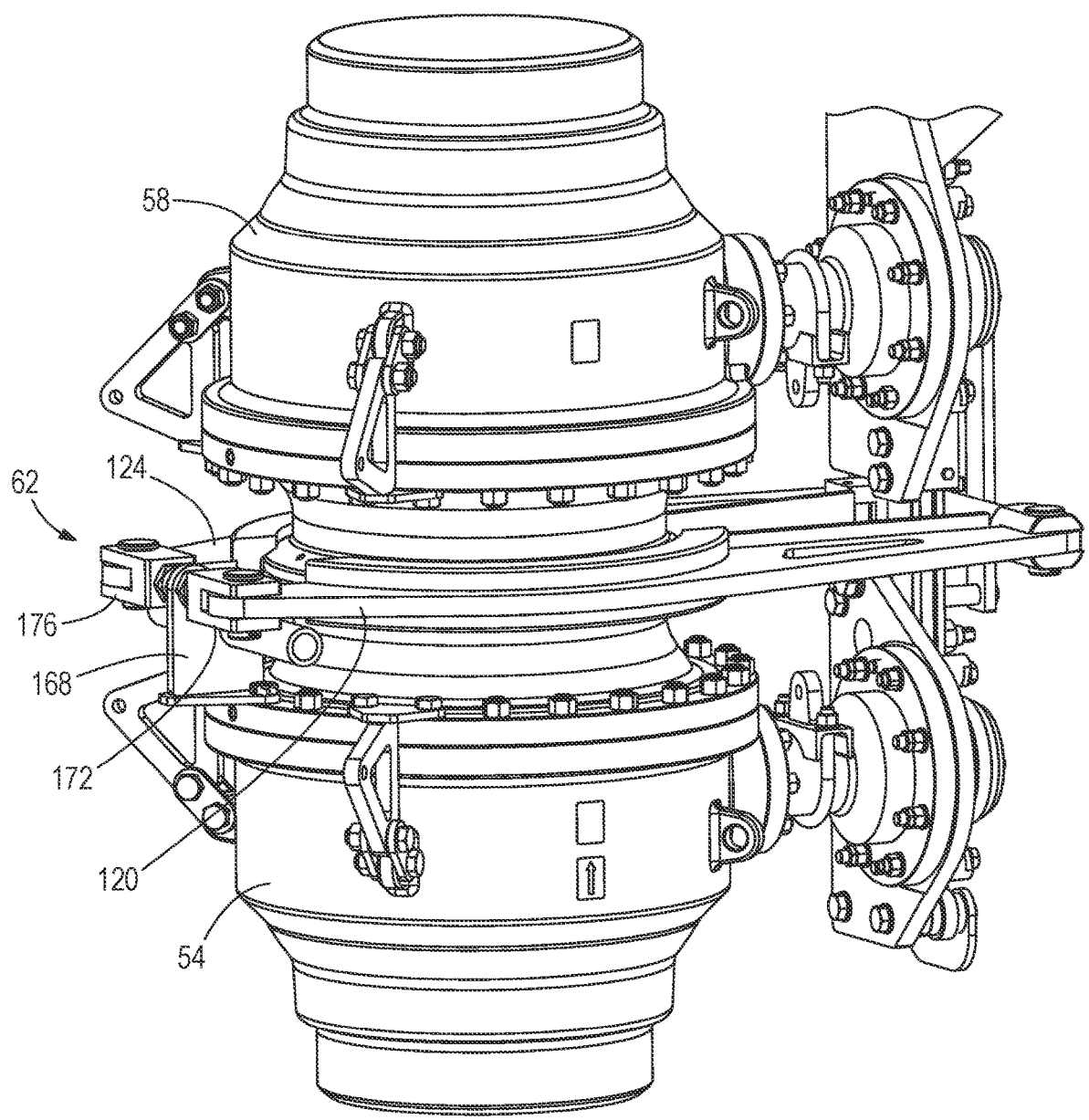
FIG. 17 is a perspective view of a portion of the emergency release system illustrating the coupler attached to the second valve and encapsulating mating flanges of the first valve and the second valve.
Figure 18:
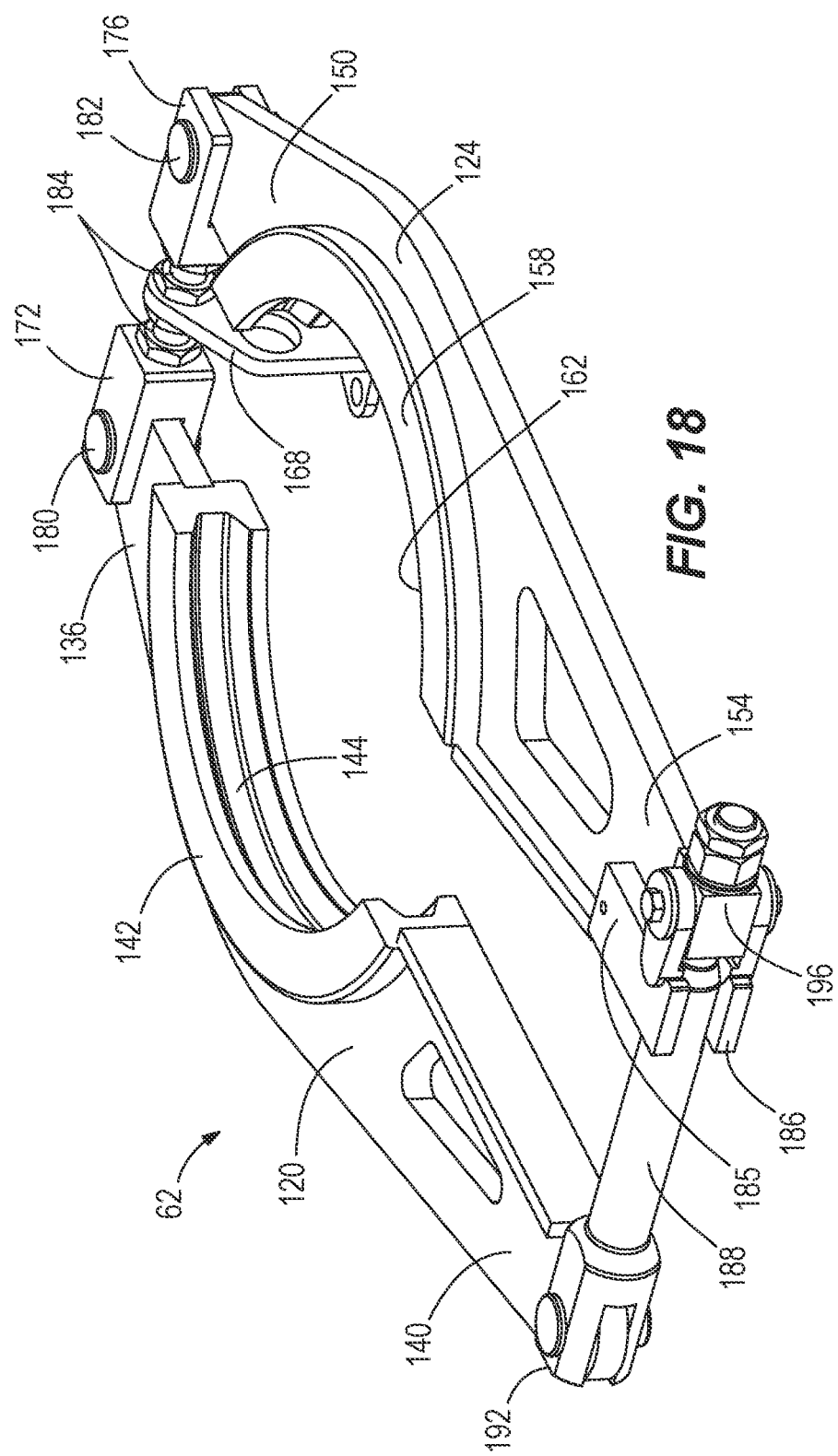
FIG. 18 is perspective view of the coupler.

As shown in FIGS. 17 and 18, the first ends 136, 150 of the first and second clamp members 120, 124 are pivotally coupled to a coupler bracket 168 that attaches to the first valve 54. As shown, a first support 172 couples the first clamp member 120 to the coupler bracket 168 (e.g., via a threaded shaft or another attachment device), and a second support 176 couples the second clamp member 124 to the coupler bracket 168 (e.g., via a threaded shaft or another attachment device) opposite the first support 172. The first support 172 includes a hinged connection 180 (e.g., a pinned connection) so that the first clamp member 120 can pivot or otherwise move relative to the second clamp member 124 and the coupler bracket 168. Likewise, the second support 176 includes a hinged connection 182 (e.g., a pinned connection) so that the second clamp member 124 can pivot or otherwise move relative to the first clamp member 120 and the coupler bracket 168. Fasteners 184 help secure the supports 172, 176 to the coupler bracket 168.

Figure 19:
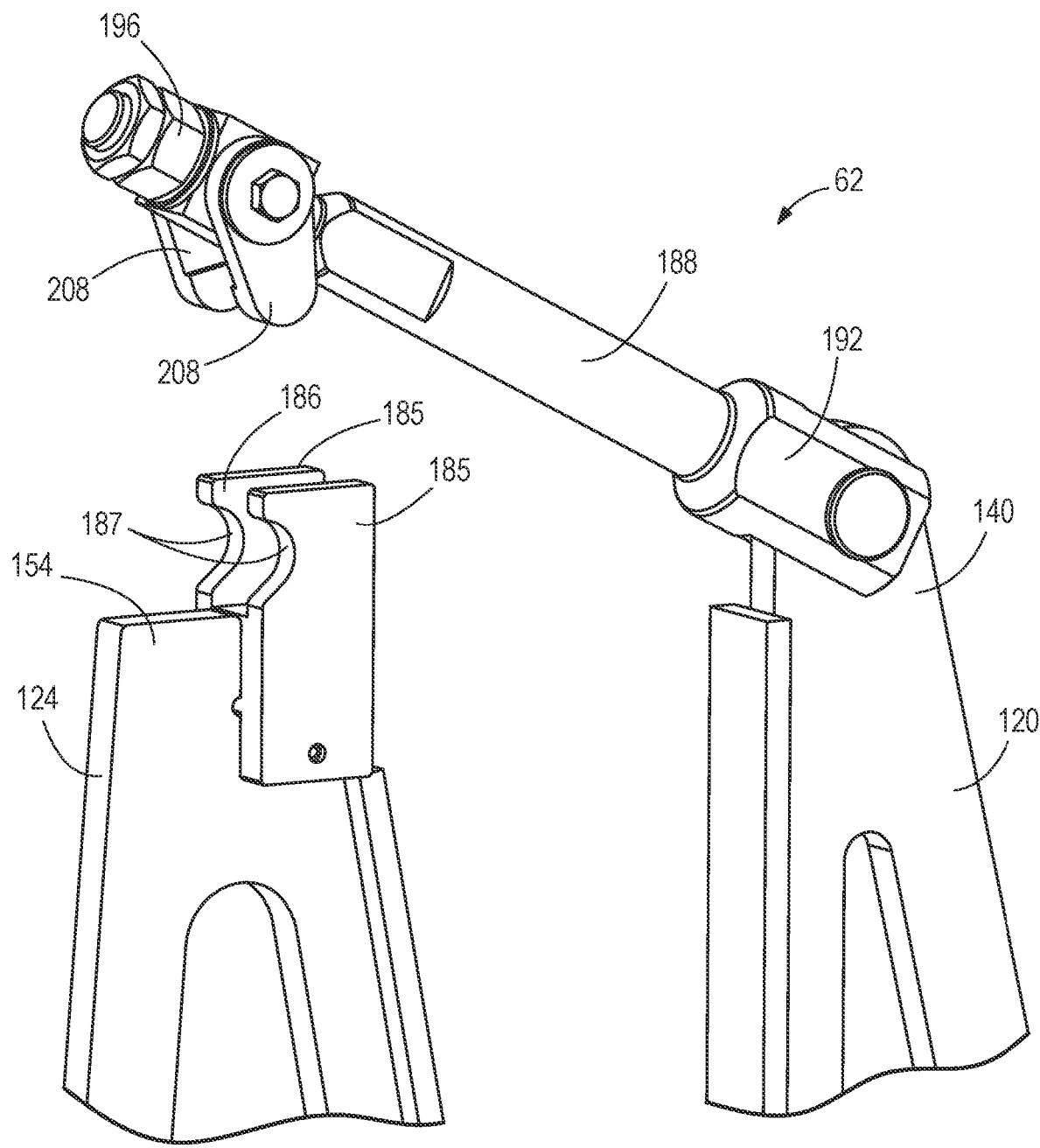
FIG. 19 is a perspective view of a portion of the coupler illustrating a gate of the coupler in an open position corresponding to the third state of the emergency release system.

As shown in FIGS. 17-19, the second end 154 of the second clamp member 124 includes gate brackets 185 that are attached to opposite sides of the clamp member 124 and that cooperate to define a channel 186. Each gate bracket 185 also defines an arcuate pocket 187. The second ends 140, 154 of the first and second clamp members 120, 124 are selectively coupled to each other by a gate 188. The gate 188 has a first end 192 that is pivotally coupled to the second end 140 of the first clamp member 120, and a second end 196 that is removably coupled to the second end 154 of the second clamp member 124 via the gate brackets 185. As shown in FIG. 19, the gate 188 includes lock elements 208 that are coupled to and movable relative to the second end 196 (e.g., rotatable or pivotable movement). The lock elements 208 engage the pockets 187 when the gate 188 is closed to secure the coupler 62 to the valves 54, 58. More specifically, the illustrated lock elements 208 pivot to clear the edges of the gate brackets 185, and then pivot back to engage the pockets 187. The complementary shapes and arrangement between the pockets 187 and the lock elements 208 define an over-center mechanism that holds the gate 188 in place and inhibits back-driving or release of the gate 188 from the gate brackets 187 absent a force applied to the gate 188. With this arrangement, the gate 188 snaps down into the locked position (best seen in FIG. 18) after the lock elements 208 engage the pockets 187 (one of the equilibrium states of the over-center mechanism; the other equilibrium state being the unlocked position shown in FIG. 19) to hold the gate 188 in place and secure the clamp members 120, 124 to each other at the second ends 140, 154.

Referring back to FIGS. 2-4, 14-16, and 20-21, the actuator mechanism 66 includes a dual rod 298 that has a first rod member 300 selectively coupled to a second rod member 304 by a rotatable latch 308. The first rod member 300 includes a first pin or projection 312 that engages and rotates the first valve actuator 82 about an axis of rotation between the first and the second positions. Similarly, the second rod member 304 includes a second pin or projection 314 that engages and rotates the second valve actuator 86 about an axis of rotation between the first and the second positions. The axes of rotation are perpendicular to the page with respect to FIG. 4.

The first rod member 300 is defined by plates 316 that are spaced apart to define a gap 324 (FIG. 14) and that move together when the dual rod 298 is actuated. As shown in FIGS. 3A, 6, 7, 10, 12, 14, 16, a safety plate 326 is attached to the first rod member 300 via spacers 327, and a stop 348 is coupled to an end of the first rod member 300 and is engageable with a bracket 358 (e.g., coupled to the first valve 54) to stop further movement of the actuator mechanism 66 in the downward direction (as viewed in the Figures).

Figure 21:
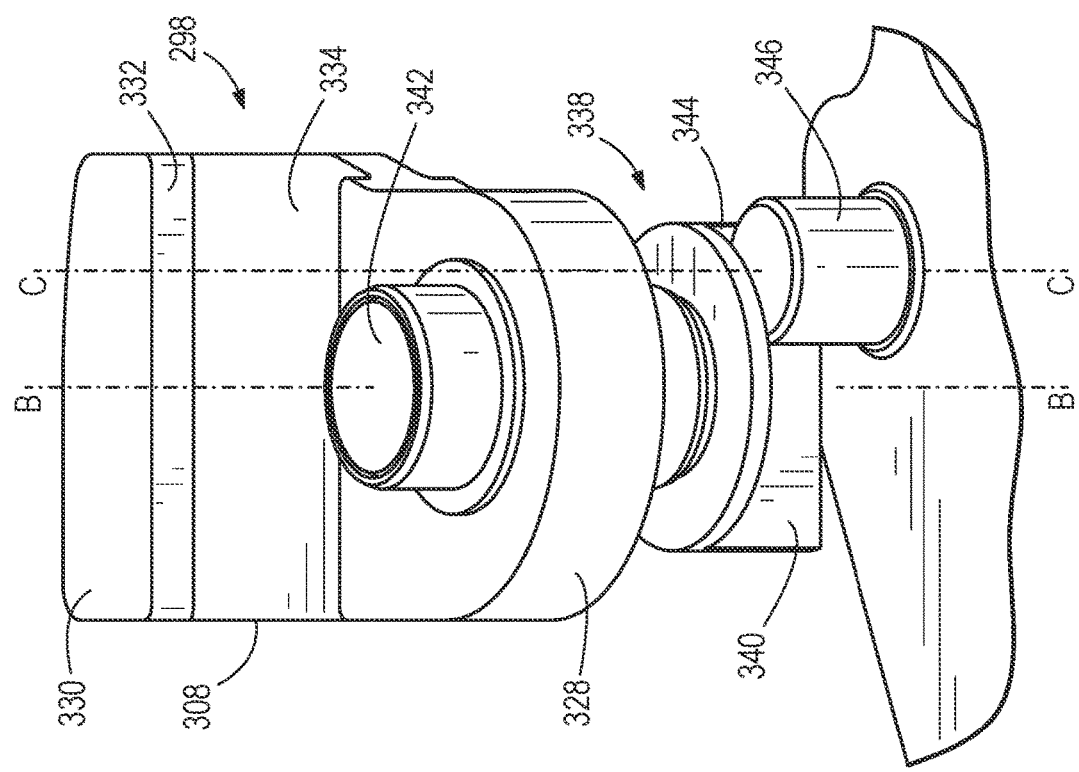
FIG. 21 is perspective view of the latch and a latch actuator mechanism.
Figure 20:
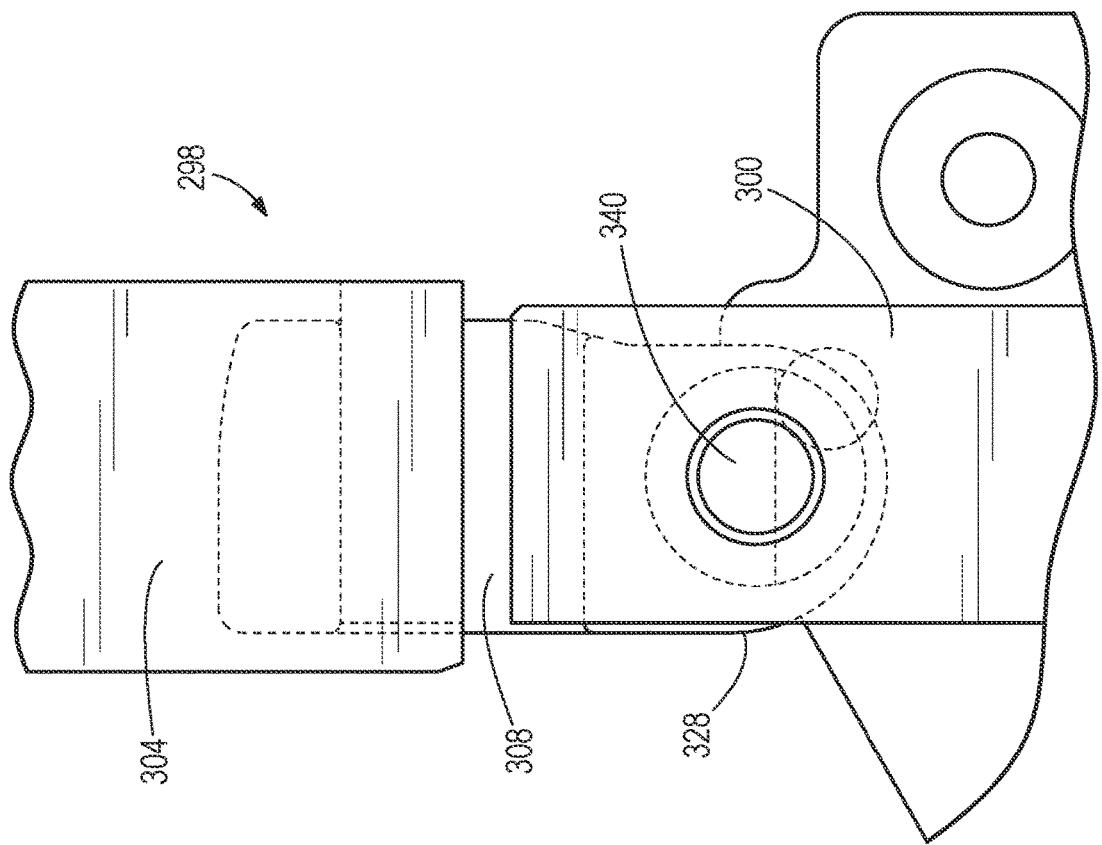
FIG. 20 is side view of a portion of the dual rod including a first rod portion and a second rod portion interconnected by a latch.

The second rod member 304 has a latch receiver 332 (FIG. 15) that is engageable by the latch 308. As shown in FIGS. 20 and 21, the latch 308 has a first end 328 that is disposed in the gap 324 and that is pivotably secured to the first rod member 300 as described in detail below. With respect to FIGS. 20 and 21, the latch 308 has a second end 330 that defines a latch feature 332 (e.g., a projection that has is wider or thicker than a central portion 334 of the latch 308) that selectively couples with the latch receiver 332. The latch feature 332 engages the latch receiver 324 to secure the rod members 300, 304 together.

The latch 308 is movable (pivotable or rotatable) from a latched position (in which the first and second rod members 300, 304 are attached to each other) to an unlatched position (in which the first and second rod members 300, 304 are detached from each other) by a latch actuator 338.

The latch 308 is pivotally coupled to the first rod member 300 by a latch actuator 338. As shown in FIG. 21, the latch actuator 338 has an eccentric, pin 340 including a post 342 with an axis B onto which the latch 308 is mounted for movement with the latch actuator 338 and an eccentric portion 344 coupled to the post 342. The eccentric pin 340 is rotatable about an axis C, which is offset from the axis B (FIGS. 16 and 32), when the eccentric, portion 344 engages a projection 346 on the first valve 58, as will be discussed in greater detail below.

The second rod member 304 also includes a gate actuator 352. As shown, the gate actuator 352 is wedge-shaped, although other shapes are possible. In general, the gate actuator 352 is shaped or positioned to engage the gate 188 and move the gate 188 to the unlocked position.

The actuator mechanism 66 includes a connected state and a disconnected state. With regard to FIGS. 2-4, 6-7, 9-10 and 20-22, in the connected state, the first and the second rod members 300, 304 are coupled to one another via the latch 308, which is aligned with both the first and the second rod members 300, 304 along an axis D. With regard to FIGS. 12-13, 15-16, and 22, in the disconnected state, the latch 308 is disengaged from the latch feature 332 and the first and the second rod members 300, 304 are separated from one another. As shown, the latch 308 is rotated out of alignment relative to the axis D (e.g., perpendicular to the axis D).

Figure 2:
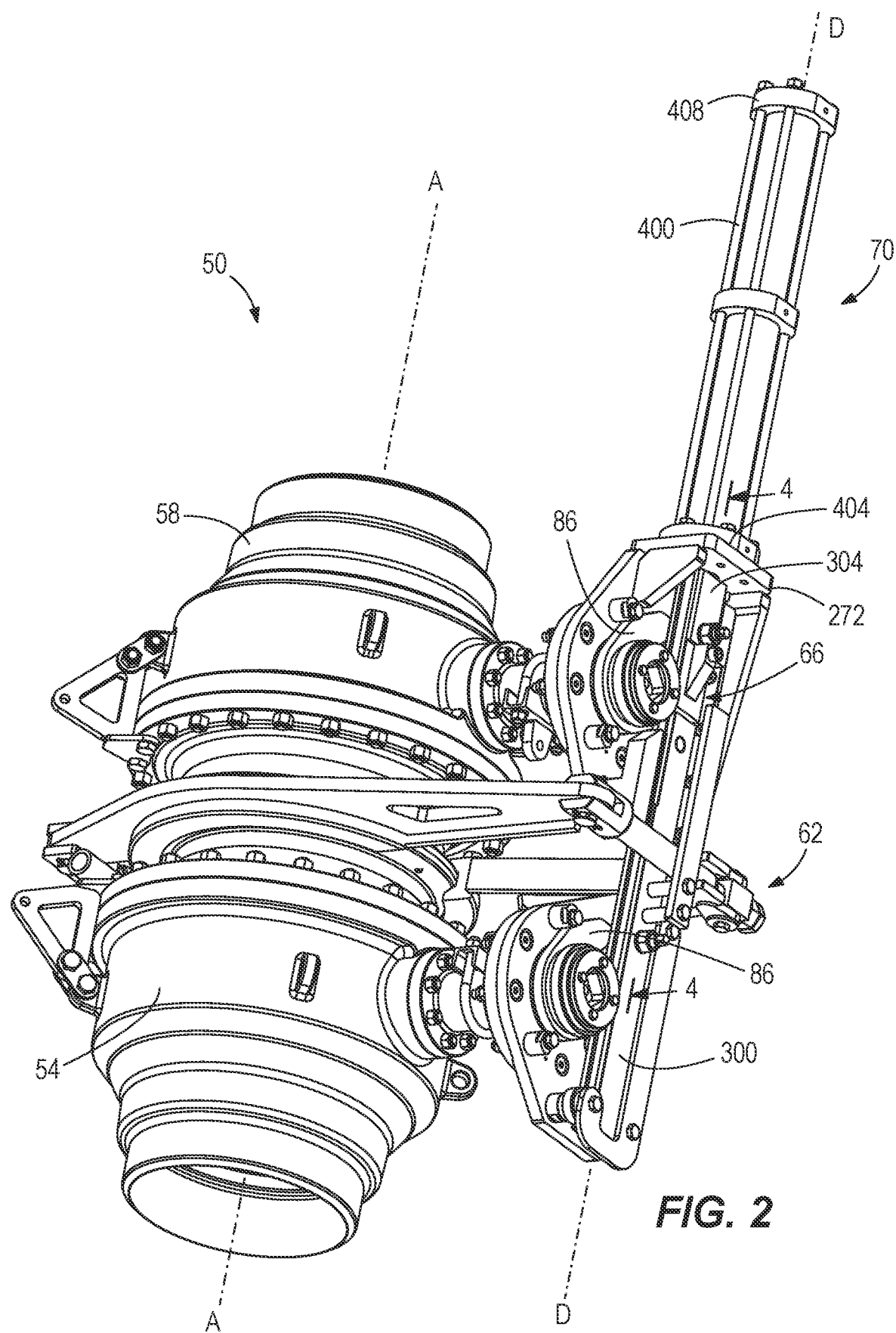
FIG. 2 is a perspective view of an emergency release system according to an embodiment of the invention and including a first valve, a second valve that is selectively secured to the first valve by an emergency release coupler, and an actuator assembly that has an actuator mechanism and a hydraulic cylinder.
Figure 3A:
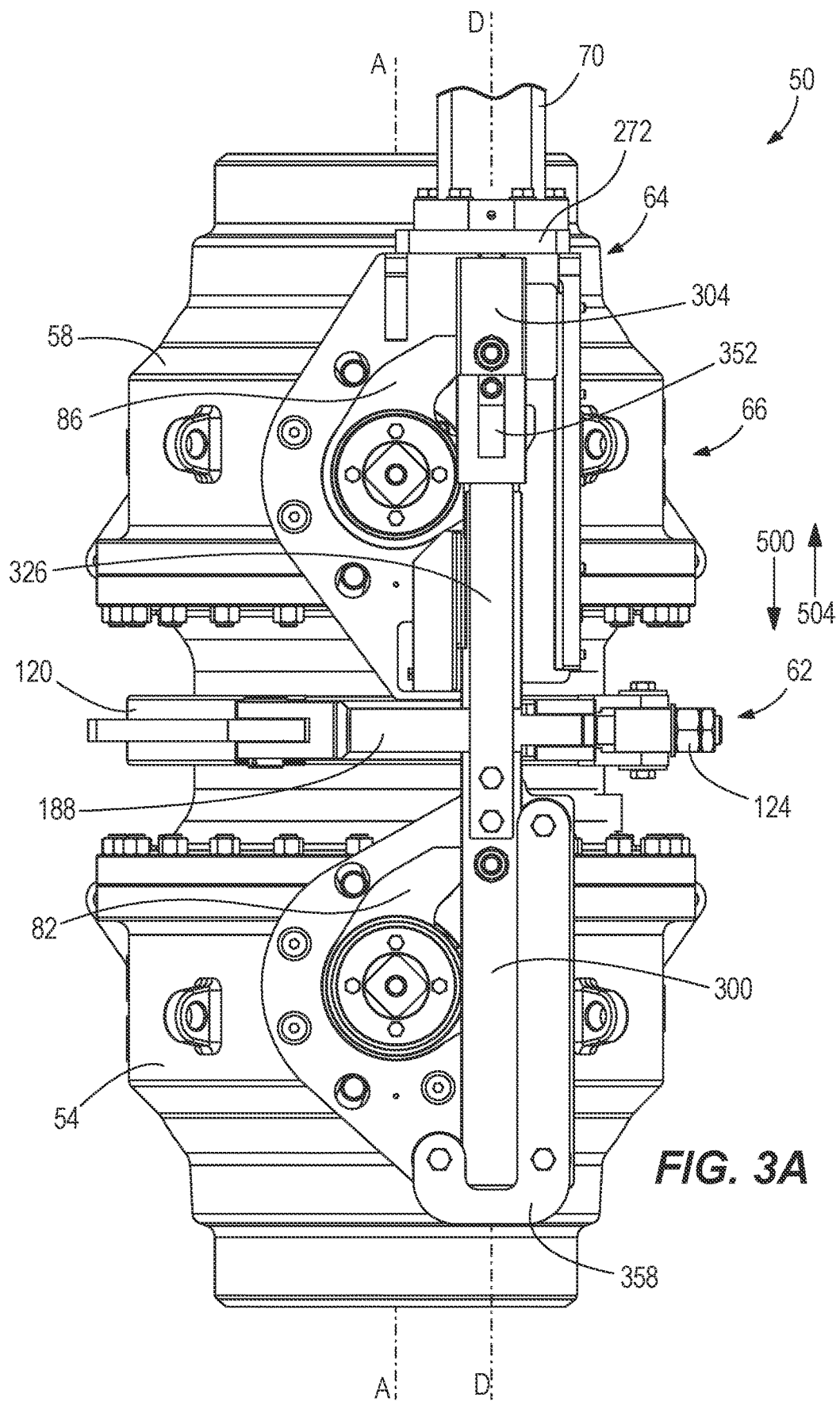
FIG. 3A is a side view of a portion of the emergency release system of FIG. 2 in a first state.
Figure 3B:
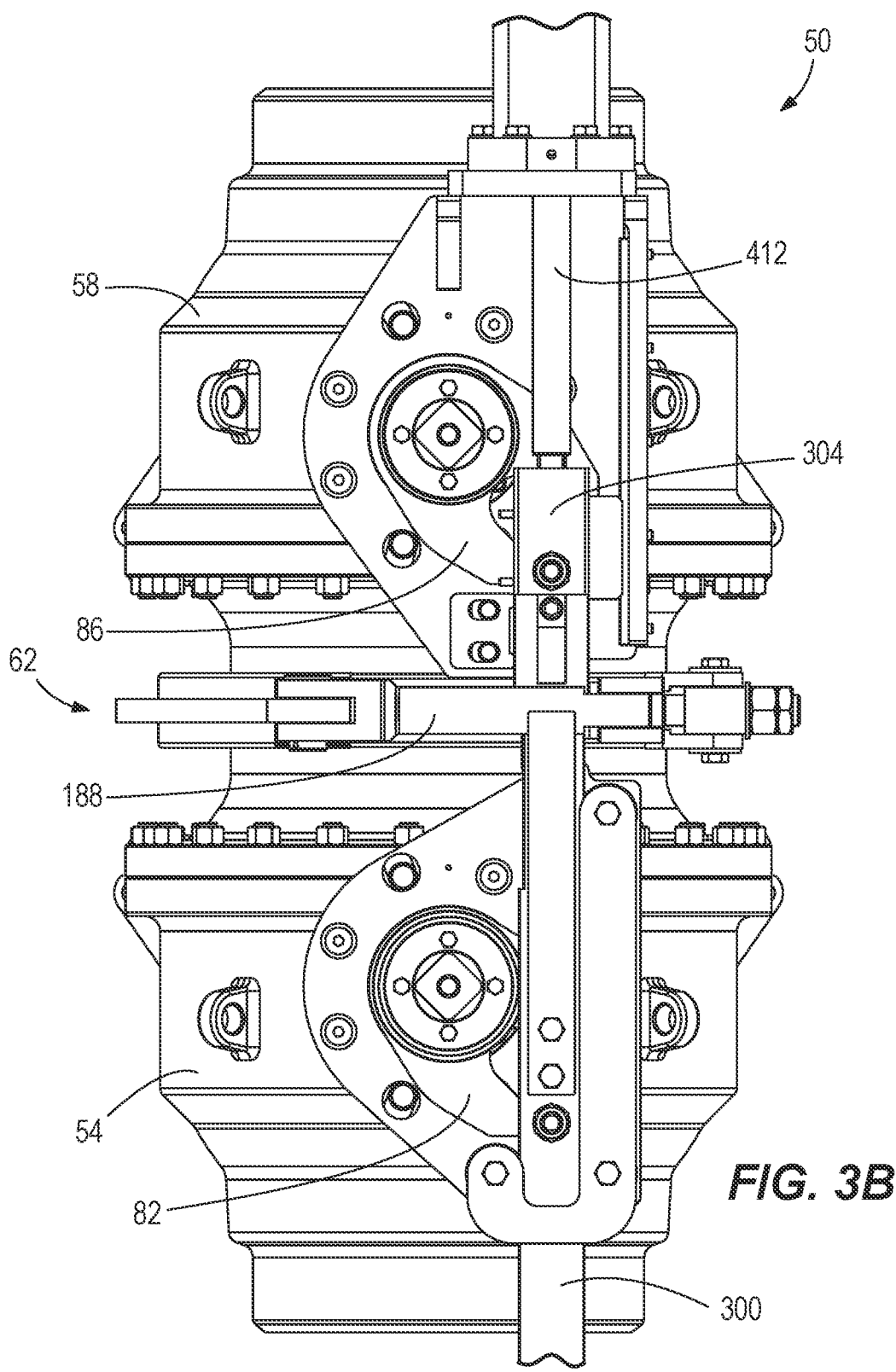
FIG. 3B is a side view of a portion of the emergency release system of FIG. 2 in a second state.
Figure 3C:
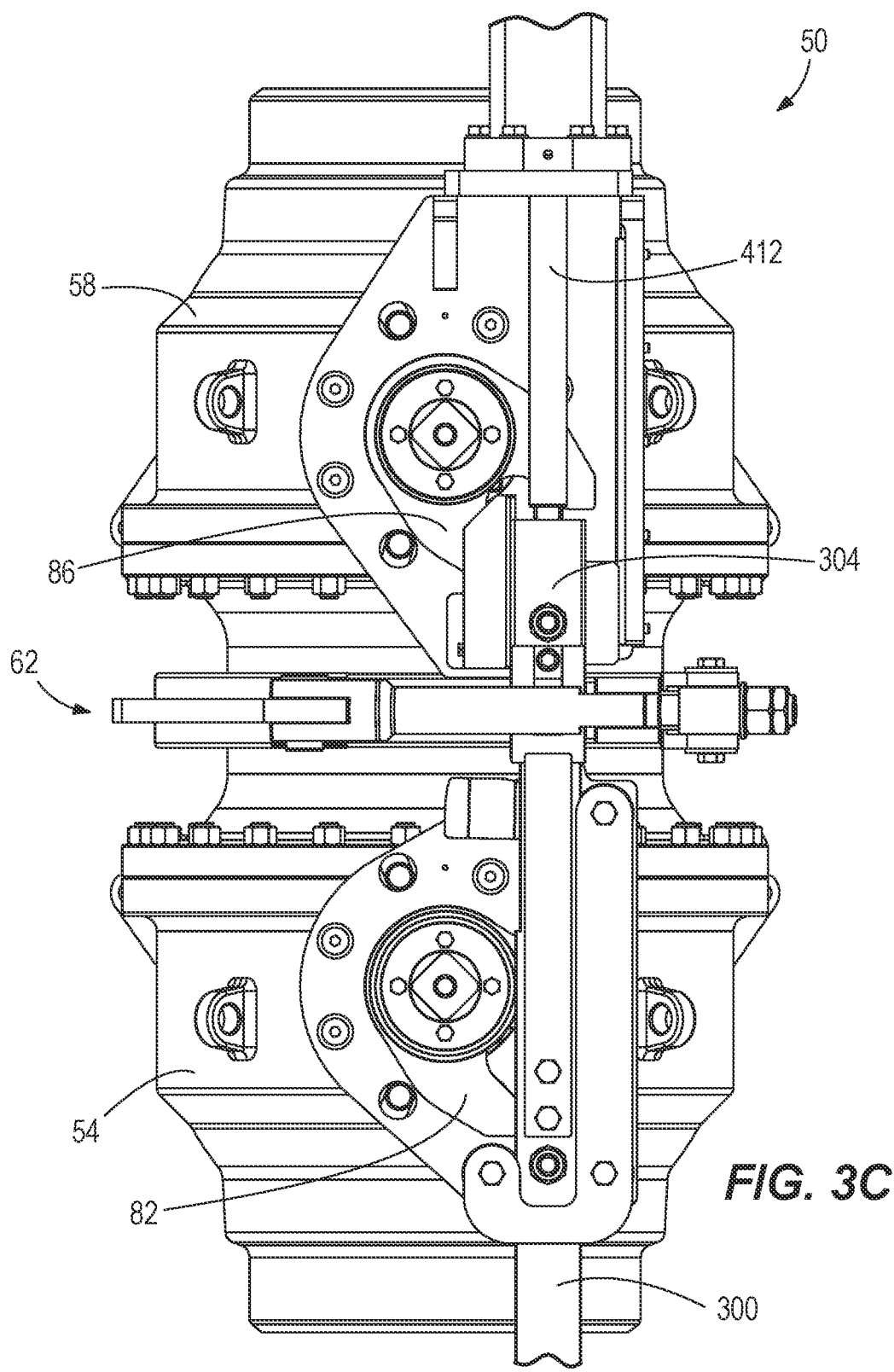
FIG. 3C is a side view of a portion of the emergency release system of FIG. 2 in a third state.
Figure 4:
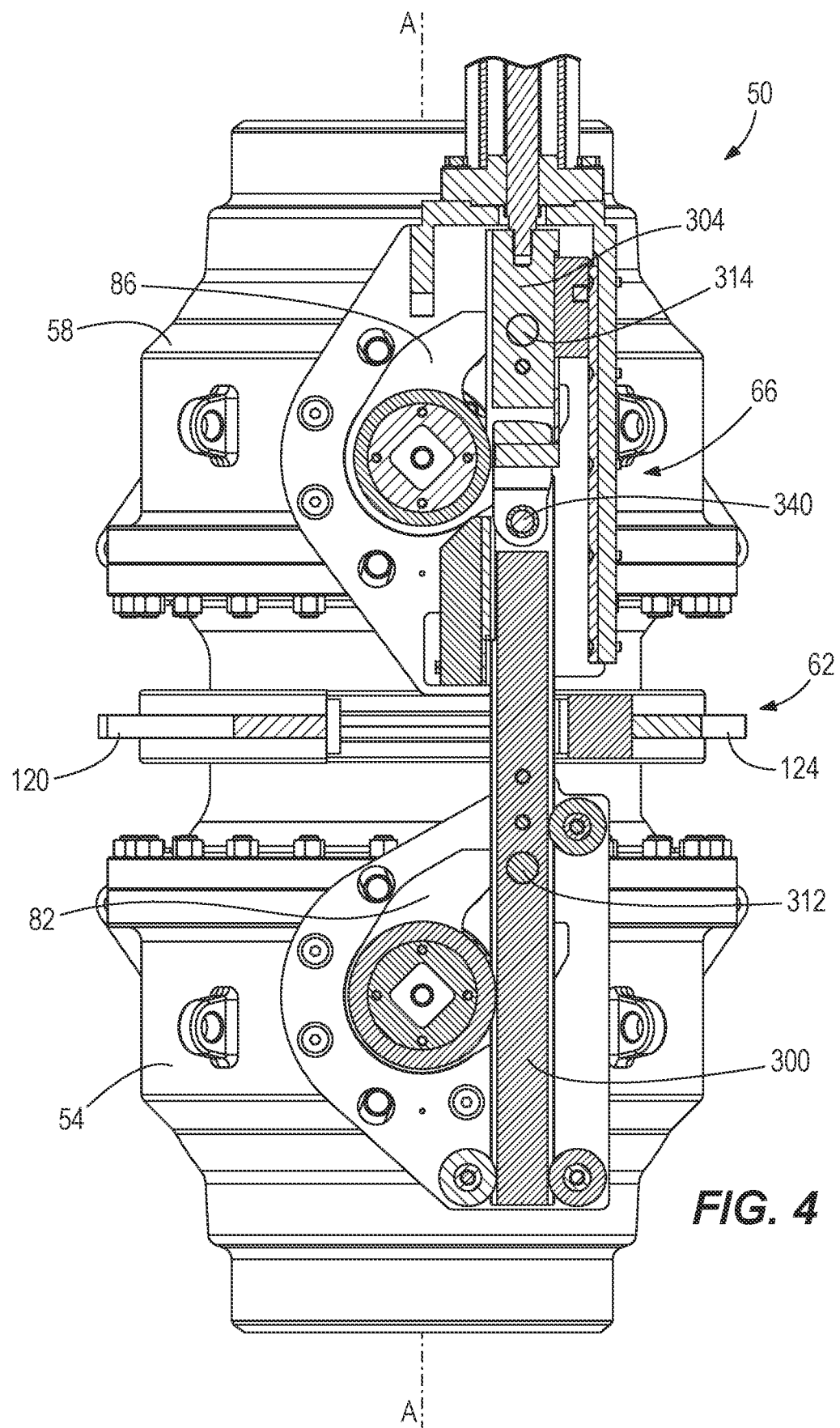
FIG. 4 is a cross-section view of the emergency release system of FIG. 2 taken along 4-4 and illustrating aspects of the actuator assembly in the first state.
Figure 7:
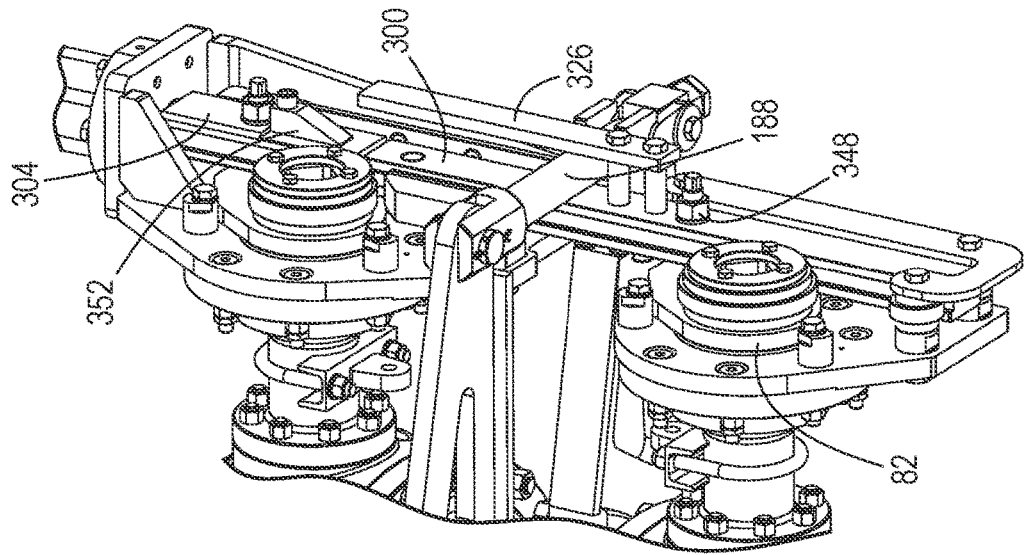
FIG. 7 is another perspective view of a portion of the emergency release system of FIG. 2 in the first state.
Figure 6:
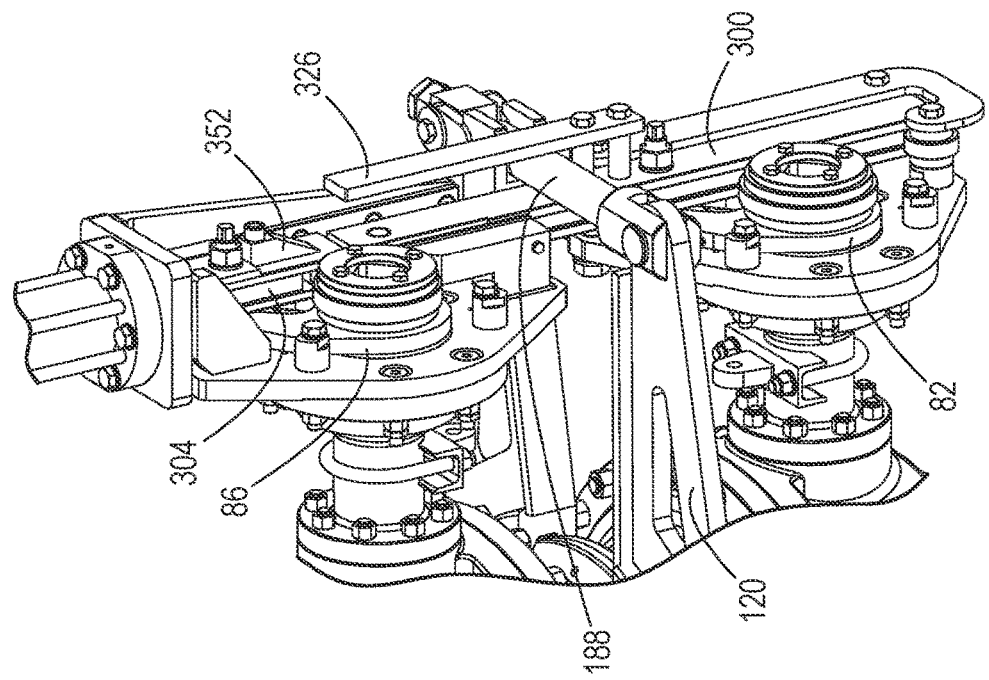
FIG. 6 is a perspective view of a portion of the emergency release system of FIG. 2 in the first state.

The cylinder 70 is configured to move the actuator mechanism 66 from the connected state to the disconnected state. Referring to FIGS. 2-4, the cylinder 70 is coupled to the second valve 58 by a bracket 272. The cylinder 70 includes a housing 400 with a first end 404 that is coupled to the bracket 272, and a second end 408 that extends from the bracket 272. With respect to FIGS. 5, 8, and 11, the housing 400 also has a first piston 412, a second piston 416, a first port 420, a second port 424, and a third port 428. The first piston 412 extends from the first end 404 of the housing 400 and is received by and secured to the second rod member 304. The first and second pistons 412, 416 are movable relative to the housing 400 and each other. That is, the pistons 412, 416 of the cylinder 70 are movable among first, second, and third positions to selectively move the dual rod 298. In the first position (shown in FIGS. 5 and 22), the first piston 412 extends beyond the housing 400 by a first distance 436, and the second piston 416 is retained entirely within the housing (i.e., a distance between the second end 408 of the housing 400 and the second piston 416 is negligible). In the second position (shown in FIGS. 8 and 22), the first piston 412 extends beyond the housing 400 to a second distance 440, and the second piston 416 is spaced apart from the second end 408 of the housing 400. In the third position (shown in FIGS. 11 and 22), the first piston 412 extends beyond the housing 400 to a third distance 448, and the second piston 416 remains spaced apart from the second end 408 of housing 400.

The emergency release system 50 is configured to respond to a first shutdown condition (ESD1), a first shutdown condition override, and a second shutdown condition (ESD2). The first shutdown condition occurs if the position monitoring system 30 determines that the vessel has drifted away from the riser 14 by a first distance from the riser 14. The first shutdown condition override occurs if the position monitoring system 30 determines that the vessel's drift has ceased, or the vessel has drifted back toward the riser 14 (i.e. drifted back to a distance between the initial distance and the first distance). The second shutdown condition occurs if the position monitoring system 30 determines that the vessel has drifted from the riser and reached a second distance from the riser 14 that is farther than the first distance and up to the predetermined distance that the loading arm 10 can extend. Additionally or alternatively, a user may actuate another mechanism (not shown) to achieve the first shutdown condition, the first shutdown condition override, or the second shutdown condition.

When the loading arm 10 is fluidly connected to the vessel and the vessel is at or near the initial distance from the riser 14 the emergency release system 50 is in a first state (FIGS. 2-7 and 22A). In the first state, the first and the second valves 54, 58 are open thereby allowing product to be transferred to or from the vessel. As shown in FIGS. 2-7 and 22A, the first and the second clamp members 120, 124 of the coupler 62 engage the abutting flanges 74, 78 of the first and second valves 54, 58, and the gate 188 is secured between the second ends 140, 154 of the first and the second clamp members 120, 124. When the gate 188 is secured between the first and the second clamp members 120, 124, the lock elements 208 are positioned within the pockets 187 of the second clamp member 124. Additionally, the first and second pistons 412, 416 are in their first position (FIGS. 5 and 22A), the first and the second valve actuators 82, 86 are in their first position (FIGS. 2-4, 6-7, and 22A), and the actuator mechanism 66 is in the connected state (FIGS. 2-4, 6-7, and 22A). In the first state, the safety plate 326 is adjacent the gate 188 of the release coupler 62 and the latch 308 of the actuator mechanism 66 is parallel to the axis D such that the first and second rod members 300, 304 are coupled to one another.

Figure 8:
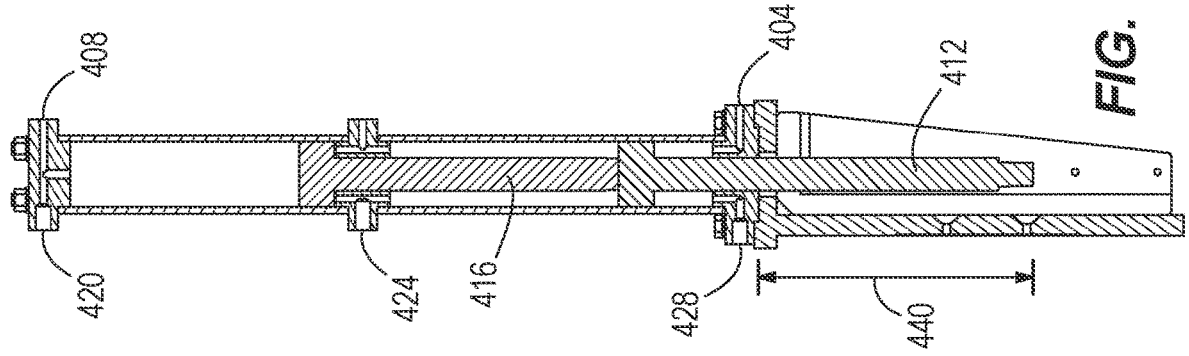
FIG. 8 a cross-sectional view of the double-stroke hydraulic cylinder of FIG. 2 taken along an axis D and illustrated in a second position corresponding to the second state of the emergency release system.
Figure 13:
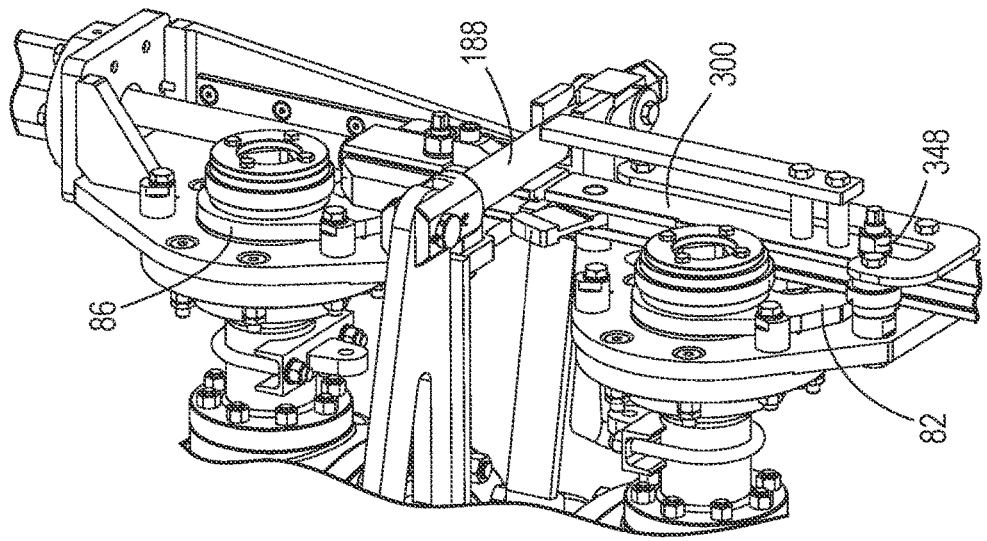
FIG. 13 is another perspective view of a portion of the emergency release system of FIG. 2 in the third state.
Figure 12:
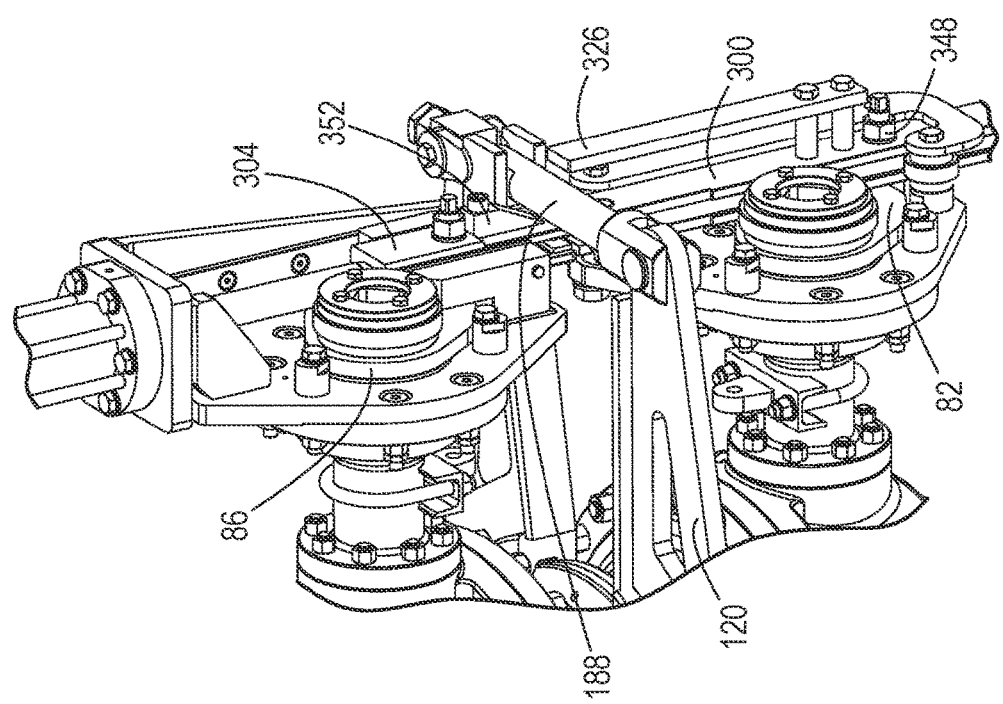
FIG. 12 is another perspective view of a portion of the emergency release system of FIG. 2 in the third state.

Upon detecting the first shutdown condition, the emergency release system 50 moves from the first state (FIGS. 2-7, 22A) to a second state (FIGS. 8-10, 228). To achieve the second state, the cylinder 70 applies a first stroke such that fluid (i.e., hydraulic fluid, pneumatic fluid, or the like) introduced through the first port 420 moves the first and second pistons 412, 416 from the first position (FIGS. 5 and 22A) to the second position (FIGS. 8 and 22B). With respect to FIGS. 8-10 and 22B, such movement of the first and second pistons 412, 416 causes the second rod member 304 of the actuator mechanism 66 to translate the actuator mechanism 66 in a first direction 500 along the axis D (FIG. 3). The movement of the actuator mechanism 66 causes the pins 312, 314 of each of the respective first and second rod members 300, 304 to engage the respective first and second valve actuators 82, 86 thereby forcing the first and second valve actuators 82, 86 to move from the first position (FIGS. 6, 7, and 22A) to the second position (FIGS. 9, 10, and 22B) to close the respective first and second valves 54, 58. In the second state, the actuator mechanism remains in the connected state, and therefore the latch 308 of the actuator mechanism 66 remains parallel to the axis D such that the first and second rod members 300, 304 remain coupled to one another. Additionally, in the second state, at least a portion of the safety plate 326 remains adjacent the gate 188 of the coupler 62, the gate 188 remains secured between the first and the second clamp members 120, 124, and the lock elements 208 remain positioned within the pockets 187 of the second clamp member 124.

Figure 5:
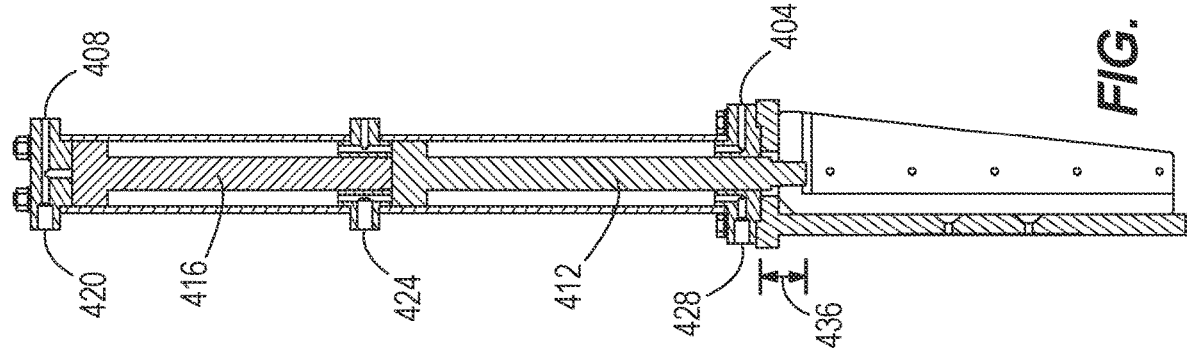
FIG. 5 is a cross-section view of the hydraulic cylinder of FIG. 2 taken along an axis D and illustrated in a first position corresponding to the first state of the emergency release system.
Figure 10:
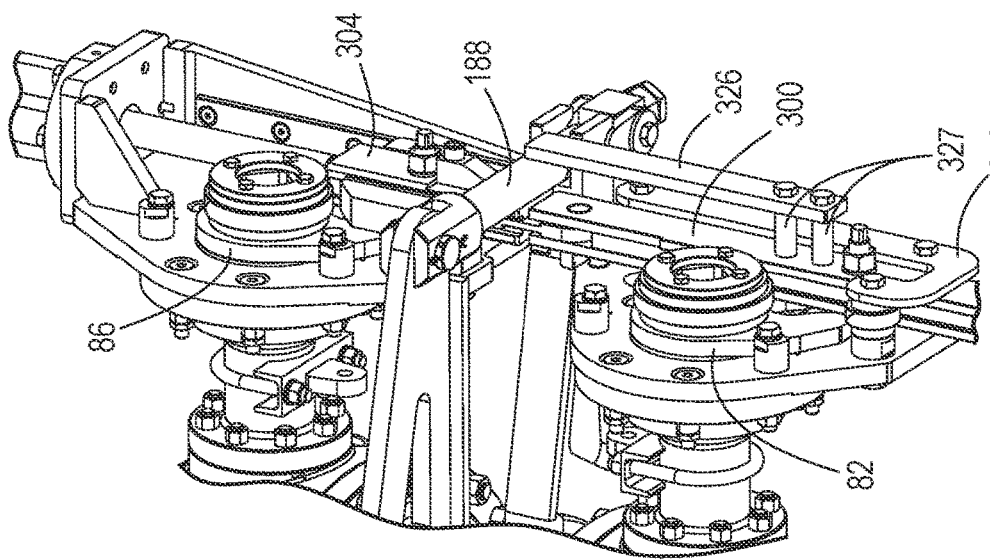
FIG. 10 is another perspective view of a portion of the emergency release system of FIG. 2 in the second state.
Figure 9:
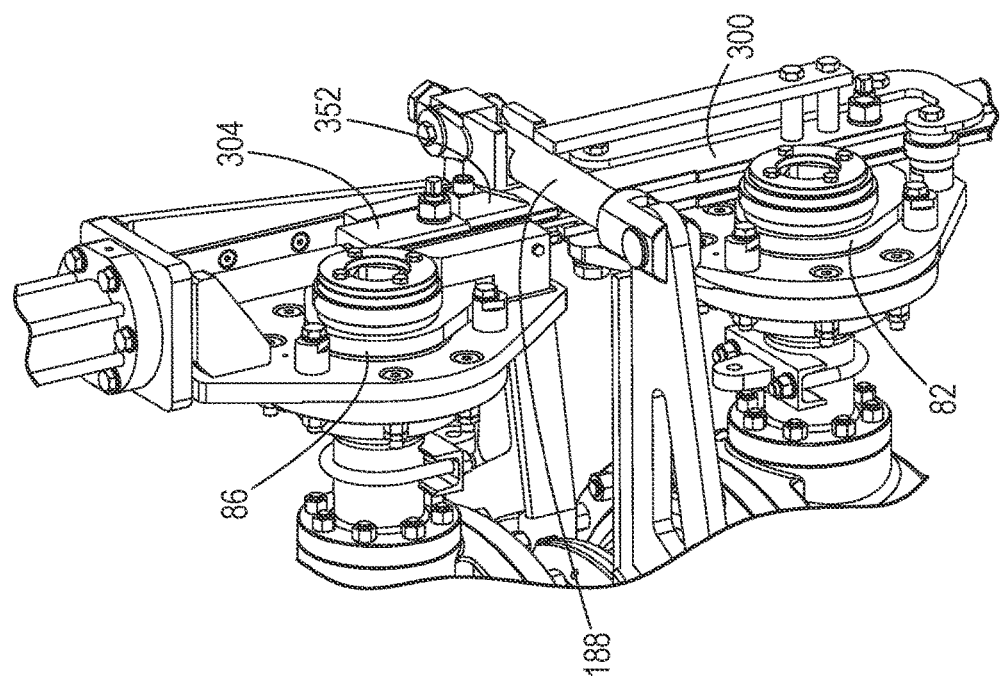
FIG. 9 is another perspective view of a portion of the emergency release system of FIG. 2 in the second state.

When in the second state, if the first shutdown condition override is detected, the emergency release system 50 moves from the second state (FIGS. 8-10, 22B) back to the first state (FIGS. 2-7, 22C). To do so, the cylinder 70 is actuated such that fluid (i.e., hydraulic fluid, pneumatic fluid, or the like) introduced through the third port 428 moves the first and second pistons 412, 416 from the second position (FIGS. 8 and 22B) back to the first position (FIGS. 5, and 22C). Such movement of the first and second pistons 412, 416 causes the second rod member 304 of the actuator mechanism 66 to translate in a second direction 504 along the axis D (FIG. 3). The movement of the actuator mechanism 66 causes the pins 312, 314 of each of the first and second rod members 300, 304 to engage the respective first and second valve actuators 82, 86 thereby forcing the first and second valve actuators 82, 86 to move from their second position to their first position to re-open the respective first and second valves 54, 58.

Figure 11:
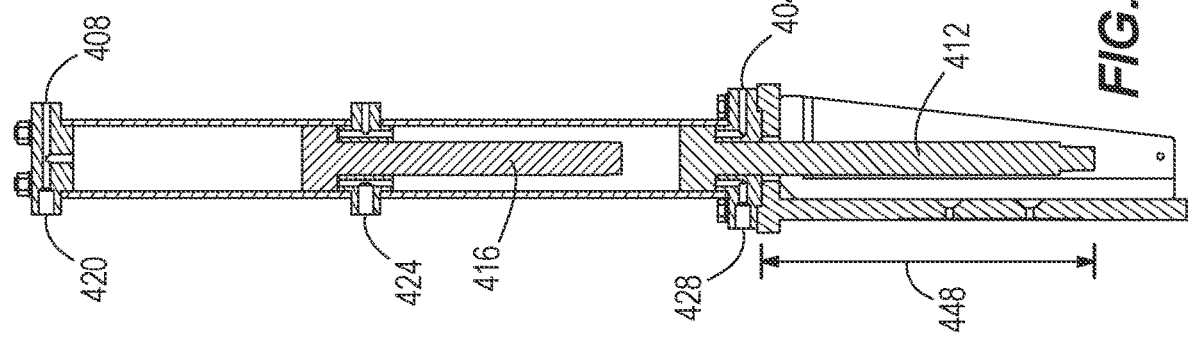
FIG. 11 a cross-sectional view of the double-stroke hydraulic cylinder of FIG. 2 taken along an axis D and illustrated in a third position corresponding to the third state of the emergency release system.
Figure 14:
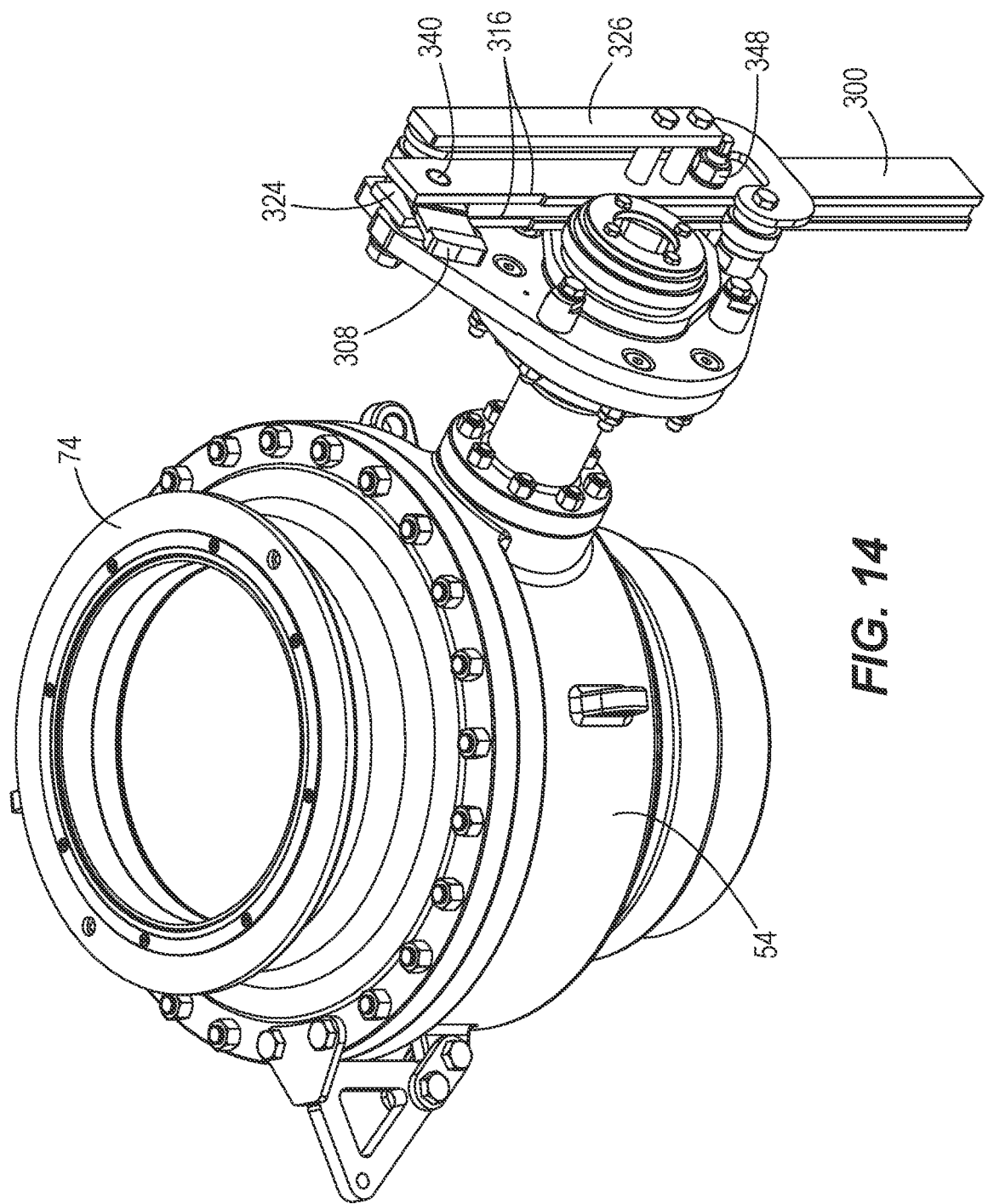
FIG. 14 is a perspective view of the first valve and a first portion of the actuator assembly.
Figure 15:
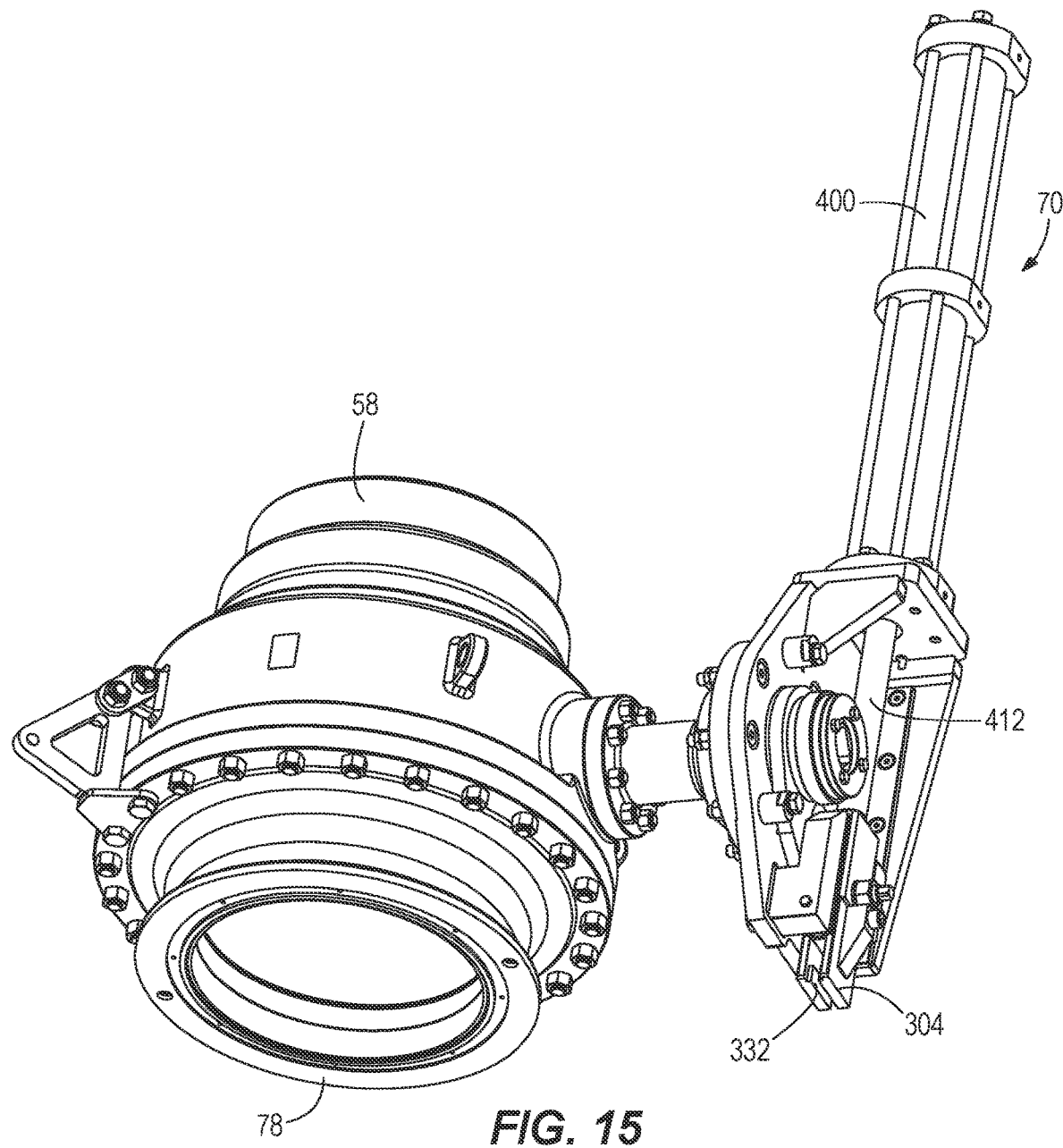
FIG. 15 is a perspective view of the second valve and a second portion of the actuator assembly.
Figure 16:
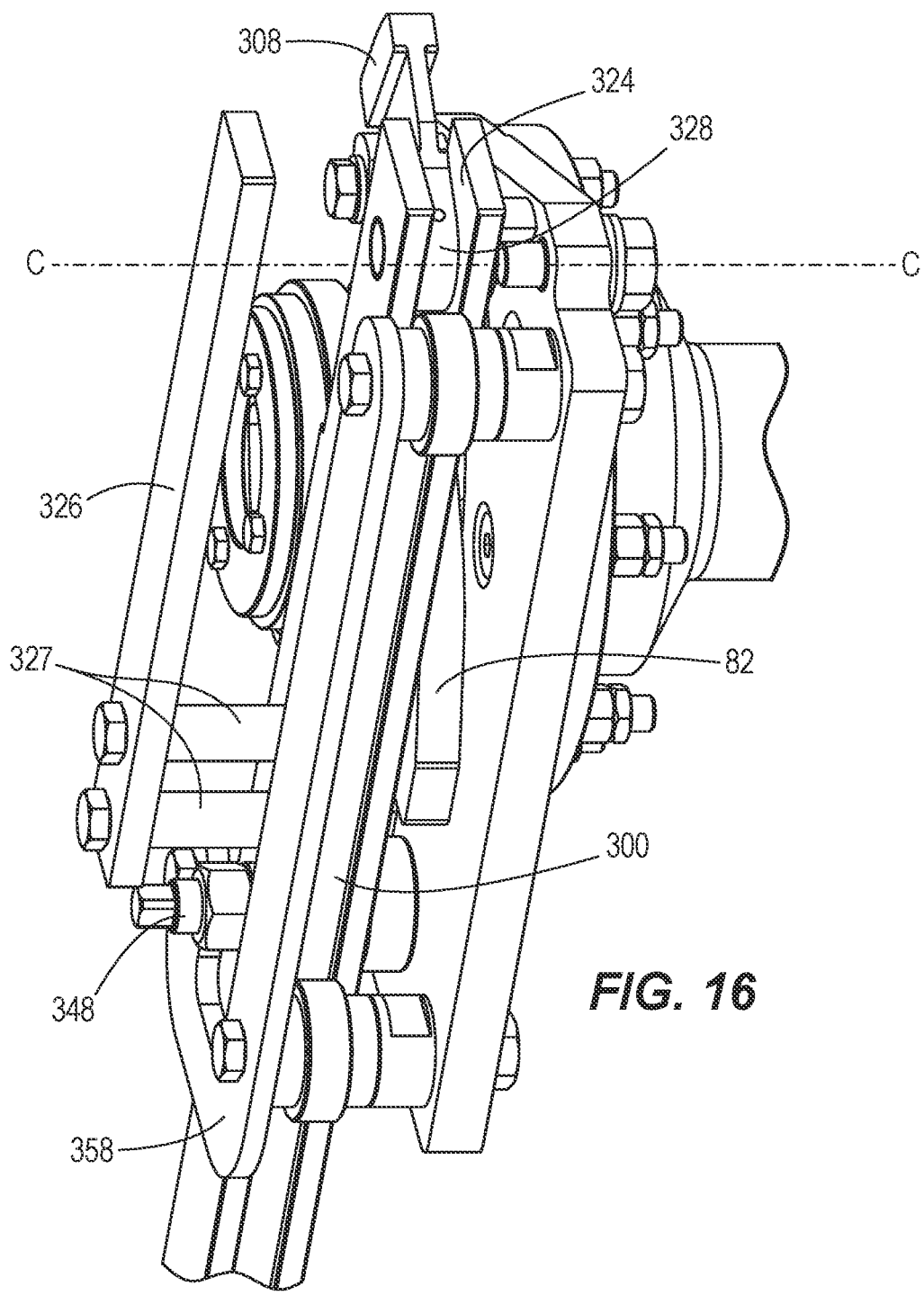
FIG. 16 is a perspective view of a portion of the actuator assembly.

Alternatively, when in the second state, if the second shutdown condition is detected, the emergency release system 50 moves from the second state (FIGS. 8-10 and 22B) to a third state (FIGS. 11-13 and 22E). To achieve the third state, the cylinder 70 applies a second stroke such that fluid (i.e., hydraulic fluid, pneumatic fluid, or the like) introduced through the second port 424 moves the first piston 412 such that the first and second pistons 412, 416 achieve the third position (FIGS. 11, 22D, and 22E). That is, movement of the first piston 412 because of the second stroke causes the second rod member 304 of the actuator mechanism 66 to continue to translate the actuator mechanism 66 in the first direction 500 along the axis D. Additionally, the safety plate 326 is displaced such that it is no longer adjacent to the gate 188 of the coupler 62. Further, the continued movement of the actuator mechanism 66 causes the eccentric portion 344 of the eccentric pin 340 to engage the projection 346 on the first valve 54 thereby rotating the post 342 of the eccentric pin 340 about the axis C (FIG. 20) and therefore, rotating the latch 308 therewith. Accordingly, with the rotation of the eccentric pin 340 and the latch 308, the actuator mechanism 66 is forced into the disconnected state (FIGS. 12, 13, and 22E-22G), and therefore the first and second rod members 300, 304 are no longer coupled to one another. With the latch 308 no longer coupling the first and second rod members 300, 304, the continued movement of the first and second pistons 412, 416 and the second rod member 304 causes the gate actuator 352 to exert a force on the gate 188 thereby disengaging the second end 196 of the gate 188 from the second clamp member 124 and pivoting the gate 188 towards the first clamp member 120 (FIG. 19). In particular, as the gate actuator 352 exerts a force on the gate 188, the lock elements 208 of the gate 188 are biased from the pockets 187 until the lock elements are disengaged from the pockets 187 entirely. This results in the gate 188 popping out of the locked position, releasing the coupler 62. Because the first and second clamp members 120, 124 are no longer coupled to one another, the second valve 54 is no longer secured to the first valve 58 and therefore can disengage from the first valve 54, leaving the coupler 62 behind supported by the support 168 on the first valve 54.

As discussed in detail above, the emergency release system 50 permits closure of the valves without actuating the breakaway coupler 62 using the first stroke of a cylinder 70, and permits separation of the dual rod 298 of the actuator mechanism 66 via the latch 308 using the a second stroke of the cylinder 70.

Various features and advantages of the invention are set forth in the following claims.

The invention claimed is:

1. An emergency release system for a fluid transfer system having a first valve and a second valve that is selectively fluidly coupled to the first valve, the emergency release system comprising:
    a breakaway coupler mechanism engageable with the first valve and the second valve to releasably couple the first valve and the second valve together, the breakaway coupler mechanism including a gate that retains the breakaway coupler mechanism on the first valve and the second valve when the gate is positioned in a locked position;
    an actuator mechanism engageable with the first valve and the second valve, the actuator mechanism including a gate actuator and a safety plate, the gate actuator configured to engage the gate of the breakaway coupler mechanism as the actuator mechanism moves from a connected state to a disconnected state, and the safety plate being positioned adjacent to the gate when the actuator mechanism is in the connected state to prevent an inadvertent actuation of the gate out of the locked position; and
    a piston-cylinder assembly configured to engage the actuator mechanism to selectively and simultaneously close the first and second valves, and to disengage the breakaway coupler mechanism from the first valve and the second valve.

2. The emergency release system of claim 1, wherein the actuator mechanism has a first pin and a second pin, the first pin being engaged with a first valve actuator of the first valve to rotate the first valve actuator about an axis of rotation between a first position and a second position, and the second pin being engaged with a second valve actuator of the second valve to rotate the second valve actuator about an axis of rotation between a first position and a second position.

3. The emergency release system of claim 1, wherein the breakaway coupler mechanism includes:
    a first clamp member engaged with the first and second valves, the first clamp member having a first end and a second end; and a second clamp member engaged with the first and second valves, the second clamp member having a first end coupled to the first end of the first clamp member and a second end, wherein the gate is coupled to the second end of the first clamp member and the second end of the second clamp member when the gate is in the locked position.

4. The emergency release system of claim 3, wherein the gate has a first end hinged to the second end of the first clamp member and a second end removably coupled to the second end of the second clamp member.

5. The emergency release system of claim 1, wherein the gate is configured to move out of the locked position by opening in a direction that is perpendicular to a direction in which the actuator mechanism moves to move from the connected state to the disconnected state.

6. The emergency release system of claim 1, wherein the breakaway coupler mechanism further comprises lock elements that releasably retain the gate in the locked position when the actuator mechanism is in the disconnected state.

7. The emergency release system of claim 1, wherein the piston-cylinder assembly comprises:
a cylinder having a housing with a first end coupled to one of the first valve and the second valve and a second end extending from the first end; and
a piston partially positioned within the housing, the piston extending from the housing and being secured to the actuator mechanism.

8. The emergency release system of claim 7, wherein the piston is movable between a first position, a second position, and a third position.

9. The emergency release system of claim 8, wherein when the piston moves in a first direction, the piston moves from the first position to the second position thereby causing the actuator mechanism to engage a first valve actuator of the first valve and a second valve actuator of the second valve, thereby moving the first valve actuator and the second valve actuator between first positions and second positions.

10. The emergency release system of claim 9, wherein continued movement of the piston in the first direction moves the piston from the second position to the third position thereby causing the breakaway coupler mechanism to disengage the first valve from the second valve.

11. The emergency release system of claim 9, wherein when the piston moves in a second direction, the piston moves from the second position to the first position thereby causing the actuator mechanism to engage the first valve actuator of the first valve and the second valve actuator of the second valve, thereby moving the first valve actuator and the second valve actuator between the second positions and the first positions.

12. The emergency release system of claim 8, wherein the piston is a first piston and the piston-cylinder assembly further comprises:
a second piston arranged to assist the first piston in moving to at least one of the first position, the second position, or the third position.

13. The emergency release system of claim 1, wherein the actuator mechanism comprises a dual rod having a first rod member and a second rod member releasably attached to the first rod member, the first rod member engageable with the first valve and the second rod member engageable with the second valve.

14. The emergency release system of claim 13, wherein the piston-cylinder assembly includes a piston coupled to the second rod member to move the actuator mechanism from a connected state in which the first and second rod members are coupled to a disconnected state in which the first and second rod members are separated from one another.

15. The emergency release system of claim 13, wherein a latch is disposed between and selectively couples the first rod member and the second rod member together.

16. The emergency release system of claim 15, wherein the latch includes a first end pivotably secured to the first rod member and a second end that selectively attached with the second rod member, the second end including a latch feature.

17. The emergency release system of claim 15, wherein the latch is coupled to the first rod member by a latch actuator having an eccentric pin with a post and an eccentric portion coupled to the post, the latch being mounted to the first rod member by the post.

18. A method of releasing a connection between first and second valves of a fluid transfer system, the method comprising:
detecting a first shut down condition;
actuating an actuator mechanism that is coupled to the first valve and the second valve with a piston-cylinder assembly to cause the actuator mechanism to selectively and simultaneously close the first and second valves;
detecting a second shut down condition; and
decoupling a coupler from the first valve and the second valve by actuating the actuator mechanism with the piston-cylinder assembly to cause a gate actuator of the actuator mechanism to engage a gate of a breakaway coupler mechanism that, with the gate in a locked position, is engageable with the first valve and the second valve to releasably couple the first valve and the second valve together, wherein the actuator mechanism comprises a safety plate positioned adjacent to the gate when the actuator mechanism is in a connected state to prevent an inadvertent actuation of the gate out of the locked position.

19. The method of claim 18, wherein actuating the actuator mechanism comprises:
moving a piston of the piston-cylinder assembly from a first position to a second position, the second position causing the actuator mechanism to close the first valve and the second valve without decoupling the coupler.

20. The method of claim 19, further comprising, wherein decoupling the coupler comprises:
moving the piston from the second position to a third position such that the coupler is only decoupled subsequent to the first valve and the second valve being closed.

* * * * *